United States Patent
Deppieri et al.

(10) Patent No.: US 8,888,003 B2
(45) Date of Patent: Nov. 18, 2014

(54) METHOD FOR DECODING A TWO-DIMENSIONAL OPTICAL CODE

(75) Inventors: Francesco Deppieri, Gambarare di Mira (IT); Antonio Pascarella, Vignola (IT); Rinaldo Zocca, Argelato (IT)

(73) Assignee: Datalogic IP Tech S.r.l., Lippo di Calderara di Reno (BO) (IT)

( * ) Notice: Subject to any disclaimer, the term of this patent is extended or adjusted under 35 U.S.C. 154(b) by 0 days.

(21) Appl. No.: 13/992,323

(22) PCT Filed: Dec. 9, 2010

(86) PCT No.: PCT/IB2010/055696
§ 371 (c)(1),
(2), (4) Date: Jun. 7, 2013

(87) PCT Pub. No.: WO2012/076931
PCT Pub. Date: Jun. 14, 2012

(65) Prior Publication Data
US 2013/0256410 A1 Oct. 3, 2013

(51) Int. Cl.
*G06K 5/00* (2006.01)
*G06K 7/14* (2006.01)
(52) U.S. Cl.
CPC .. *G06K 5/00* (2013.01); *G06K 7/14* (2013.01); *G06K 7/1465* (2013.01); *G06K 7/1417* (2013.01)
USPC ........................................ 235/437; 235/462.1
(58) Field of Classification Search
CPC .............. G06K 7/1417; G06K 7/1443; G06K 19/06037
USPC .................................... 235/437, 462.9–11, 26
See application file for complete search history.

(56) References Cited

U.S. PATENT DOCUMENTS

| | | | |
|---|---|---|---|
| 5,347,114 A | 9/1994 | Tanaka | |
| 5,821,519 A | 10/1998 | Lee et al. | |
| 7,281,660 B2 * | 10/2007 | Kim et al. | 235/462.09 |
| 7,344,080 B2 | 3/2008 | Vinogradov et al. | |
| 7,380,718 B2 * | 6/2008 | Nakamura | 235/462.01 |
| 7,878,416 B2 * | 2/2011 | Lapstun et al. | 235/494 |
| 7,997,502 B2 * | 8/2011 | Lv et al. | 235/494 |
| 2005/0279836 A1 | 12/2005 | Havens | |
| 2006/0043194 A1 | 3/2006 | Barkan et al. | |

OTHER PUBLICATIONS

International Search Report and Written Opinion dated Jul. 22, 2011 in corresponding International Application No. PCT/IB2010/055696.

* cited by examiner

*Primary Examiner* — Daniel St Cyr
(74) *Attorney, Agent, or Firm* — Duane Morris LLP

(57) ABSTRACT

A method for decoding a two-dimensional optical code formed by a set number of codewords, wherein decoding the code based on a single acquired image has not been successful, includes analyzing an acquired image and at least one further acquired image and obtaining a respective set and further set of values of identified codewords. Each codeword can take on either an undefined value or vice versa a numeric value if the codeword is recognized. A combined set of codewords is created and each codeword of the combined set is assigned a value of a codeword of the set and/or of the further set and an algorithm for detecting and self-correction of errors is applied to the combined set to obtain confirmation of successful decoding of the two-dimensional code.

25 Claims, 2 Drawing Sheets

METHOD FOR DECODING A TWO-DIMENSIONAL OPTICAL CODE

BACKGROUND AND SUMMARY OF THE INVENTION

The invention relates to a method for decoding a two-dimensional optical code.

In particular, the invention relates to a method for decoding a two-dimensional optical code in which decoding the code, based on a single acquired image, is not successful. For example, the method has particular application for reading two-dimensional optical codes positioned on reflecting surfaces.

By the term "two-dimensional optical code" a set of graphic marks is intended, located on a label or directly on a product, by means of which information is associated with a surface divided into white, black or coloured cells, arranged in one or more directions. Some of the most common two-dimensional symbologies on the market are the PDF-417, QR Code or Aztec and two-dimensional codes of different symbologies may differ by shape (for example square or rectangular), and/or by the manner of coding data (for example a matrix arrangement or a superimposed barcodes), and/or by the quantity of stored data.

All the two-dimensional codes, even if they refer to different types of symbologies, enable a large number of "data of interest" to be coded in a short space through a combination of suitably arranged unitary information. It is pointed out that the term "relevant information" or "data of interest" indicates any information or information set that is coded and stored in a two-dimensional code.

A two-dimensional optical code is formed by a total number of codewords (identified below in the text and/or in the figures also by CWs) and each codeword (identified below in the text and/or in the figures also by CW), which represents an alphanumeric value coded in a certain arrangement of elementary white, black or coloured cells, constitutes the unitary information contained in the code.

In addition to the codewords necessary for forming the data of interest, a two-dimensional optical code also comprises redundant codewords, which enable reading errors to be detected and possibly corrected by specific algorithms for self-correcting the errors, which are illustrated in greater detail below.

In order to decode a two-dimensional code, the image on which the code is positioned is analysed by known image analysis methods for obtaining a set of codeword values assigned to the code, equal to the total number of codewords from which the two-dimensional code is formed. Each codeword can be identified and thus take on a numeric value, if the codeword is recognised, or vice versa can take on an undefined value if the codeword is not recognised, for example because the portion of image in which the codeword is positioned was damaged at the moment of acquisition of the image.

The algorithms for error detection and self-correction provide both the possibility of filling codewords of undefined value, otherwise known as holes, and of correcting erroneous codewords.

The algorithm for error detection and self-correction that is currently used by all the main two-dimensional symbologies is the Reed Solomon algorithm (identified below in the text and/or in the figures also as RS), but further algorithms for error detection and self-correction are also known, such as, for example, the "turbo code" or the "convolutional code". The term "algorithm for error detection and self-correction" means below and without restrictions either the Reed Solomon code, or the "turbo code" or the "convolutional code".

Owing to the application of algorithms for error detection and self-correction, it occurs that decoding of a two-dimensional code, which comprises analysing the image on which the code is positioned, identifying the codeword values that are part of the code and checking the code by applying an algorithm for detection and self-correction of errors, such as, for example, the RS algorithm, can take place successfully also if the analysed image has deteriorated partially and thus the value of certain codewords is erroneous or undefined.

In other words, a two-dimensional code can be decoded by a reader of optical codes even if it is partially unusable, for example because it is covered or damaged by spots, abrasions or also if it is positioned on reflecting surfaces. For example, an image of an optical code positioned on a reflecting surface is often partially damaged due to bright spots in some zones of the image.

Nevertheless, when the unusable or damaged image portion of the code becomes excessive, the RS algorithm for error detection and self-correction is not able, by analysing a single image, to decode successfully the coded data of interest and it is thus necessary to analyse also further images of the same code.

In the case of manual readers, the user, by not receiving any good reading notice, tends to move or orient differently the reader to acquire an image that is lighted differently from the preceding image. On the other hand, in the case of the fixed reading systems, the object that carries the code is moved by an external device or by the user, with a random or guided movement, to ensure that in the successively acquired images high luminosity zones, or vice versa poorly lit zones are situated in different positions.

Combining the information that comes from successive images is known, in order to supplement codewords that are not recognised in an image arising from an acquisition, with corresponding codewords recognised in a further image, deriving from a further acquisition, in order to obtain information that is sufficient to enable the entire code to be decoded. From a set of codewords and from a further set of codewords a set of combined codewords is obtained for decoding the code.

U.S. Pat. No. 7,344,080 discloses a coded information reader provided with a guide in which a support (typically a plasticised card) containing a two-dimensional code is moved with respect to a device for capturing and decoding images. The device captures a series of images that may contain only a part of the code or the entire code, and, subsequently, the images are combined to obtain complete decoding of the code by a combination method, which recalls a method illustrated in U.S. Pat. No. 5,821,519, which is a combination method relating to a linear code.

In particular, the methods for decoding coded information based on the combination of information coming from several partial readings of the same linear code are commonly indicated as "stitching" methods.

U.S. Pat. No. 5,821,519 relates to "stitching" linear bar codes and is based on a reconstruction of a barcode achieved starting with images containing respective partial linear scans. In each analysed image, a sequence of characters is identified and amongst the various images a superimposed zone is sought, possibly of preset length, that contains an identical information fragment, by means of which to combine the partial code fragments. As the linear codes always comprise a "start" character, a "stop" character or a "localisation character", also these characters are sought in the various partial scans in order to store each character identified in the correct position in the reconstructed set of characters with which to decode the barcode.

Further, an "expected reliability value" (ER) is assigned to each character the value of which is identified, to ensure that the reconstructed barcode contains the identified characters having the highest ER value. The "stitching" method disclosed requires above all that all the characters be identified inasmuch as, otherwise, it is not possible to decode the barcode.

Applying the "stitching" method disclosed by U.S. Pat. No. 5,821,519 relating to linear bar codes and which is specific for linear bar codes, nevertheless poses some problems if applied to the two-dimensional bar codes.

First of all, particular repeated characters do not exist in a two-dimensional code, by means of which it is possible to identify superimposed zones that are usable for combining the partial code portions. Further, the decoding method of U.S. Pat. No. 5,821,519 fails if the reconstructed set of characters comprises characters with an undefined value. This logic is certainly not applicable to a two-dimensional code, inasmuch, as said previously, a two-dimensional code could be decoded even if it has undefined codewords.

Further, basing acceptance of a value of a character on an expected reliability (ER) value, favouring the characters with the highest ER value, introduces a probabilistic choice and characters with an erroneous value could be introduced into the reconstructed set of characters inasmuch as they are very probable.

One property of the Reed Solomon algorithm is that it operates with greater efficiency with an unknown codeword rather than with an erroneous codeword because, in order to regenerate the value of a missing codeword, the Reed Solomon algorithm considers just one additional codeword whereas for correcting a codeword the value of which is erroneous, the Reed Solomon algorithm has to consider two additional codewords. Thus, a decoding method of a two-dimensional code deriving from known "stitching" methods relating to linear codes is not optimal and introduces limitations to the decoding itself, inasmuch as it tends to fill all the codewords, also accepting erroneous values and thus makes the operation of the Reed Solomon algorithm less efficient. All this is reflected, in the case of manual readers or in the case of fixed vision systems, into long waiting times for the good reading message, which overall makes decoding slower.

The object of the present invention is to provide a decoding method for decoding an optical code, which is particularly efficient for decoding a two-dimensional optical code if decoding of the code based on a single acquired image is not successful and it is necessary to consider the combination of several images.

A further object of the present invention is to make decoding of a two-dimensional code fast by exploiting the properties of the algorithms for error detection and self-correction.

According to the invention, there is provided a decoding method as defined in claim 1.

Owing to the invention, a decoding method is provided that is particularly dedicated to two-dimensional optical codes that comprises a combination method of images according to which in the presence of corresponding codewords, the values of which are different, it assigns an undefined value to a corresponding codeword of the combined set, if this codeword of the combined set is evaluated as unreliable.

According to one embodiment, a codeword is judged to be reliable if the same value is identified for a number of times at least equal to a predetermined reliability threshold value, this threshold value being in particular greater than 1.

In this manner, the probability of having an erroneous codeword is decreased as a codeword is required to be seen to be always identical to itself for a certain number of times in succession before being marked as being reliable. In the case of values of contrasting codewords, if the reliability threshold for the codeword is not reached, it is preferred to assign an undefined value to the codeword.

Further, introducing undefined values into the set of combined values makes it more probable that the algorithm for error detection and self-correction is successful inasmuch, as said previously, this algorithm is more efficient in determining the value of missing codewords rather than correcting erroneous codewords.

BRIEF DESCRIPTION OF THE DRAWINGS

The invention can be better understood and implemented with reference to the attached drawings, which illustrate some embodiments thereof by way of non-limiting example, in which.

DETAILED DESCRIPTION

Figure 1:
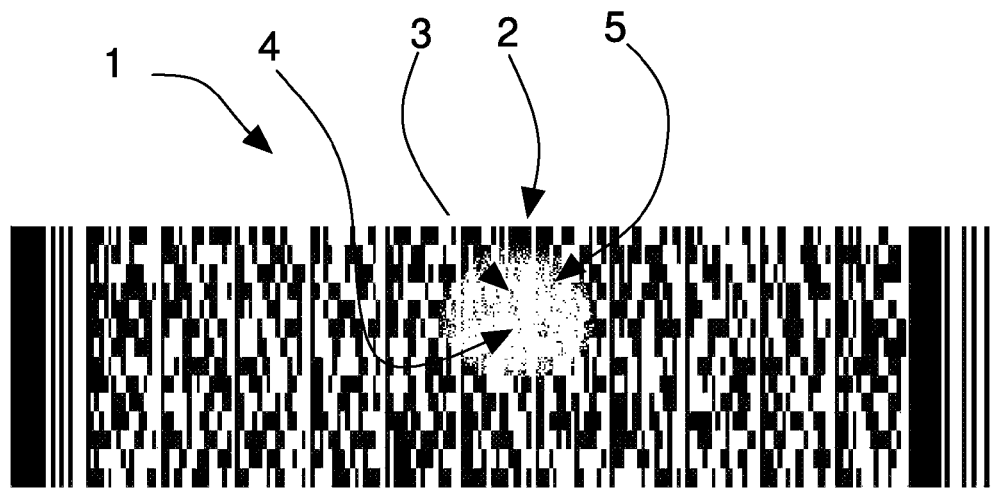
FIG. 1 shows an image of a two-dimensional barcode, the symbology of which is PDF417, as acquired by an optical reader in a lighting condition.

With reference to FIG. 1, there is shown an image, as acquired by a reader (which is not shown), in which a two-dimensional code 1 is present, in particular a PDF-417 symbology code.

The two-dimensional code in FIG. 1 is represented as a succession of elementary black and white cells on a white background. It can be noticed that a portion of image 2 of the code has deteriorated, for example because the supporting surface on which the two-dimensional code is positioned is reflective. The portion of image 2 comprises a highly luminous white spot 3 at which the elementary cells of which the two-dimensional code is made are not identifiable. Typically, a white spot has a central zone 4 that is almost uniformly white and an edge that is on the other hand blurred 5, the edge bounding the deteriorated portion from the succession of elementary white or black non corrupted cells. It is important to emphasise that very often the elementary cells arranged in the blurred edge 5 can give rise to a codeword CW or several codewords CWs with an erroneous value. In fact, the elementary cells of the edge 5 can be interpretable at random if they are not completely corrupt, but may possibly not reproduce the correct arrangement of white or black cells that code the correct value of the codeword.

The two-dimensional code 1 comprises a total number of codewords and from the combination of the values of these codewords it is possible to code and store "data of interest" in the code. This total number of codewords can be obtained directly by analysing the two-dimensional code, inasmuch as some symbologies explicitly show this total number, which is coded by a specific arrangement of elementary cells. In other symbologies, on the other hand, this total number is obtainable from two numbers expressed with respective specific arrangements of elementary cells that are the number of lines and the number of columns.

It will be understood below, without losing generality, that the total number of codewords is obtainable directly by analysing the two-dimensional code or is obtainable therefrom by means of the calculation of the number of lines multiplied by the number of columns.

Further, it will be understood below that the decoding method can comprise both analysing already acquired images, the images being memorised in succession from an optical code reader, and acquiring an image via an optical code reader to analyse the image immediately afterwards and acquire a subsequent one thereof only at the end of the analysis of the previous one.

Figure 3:
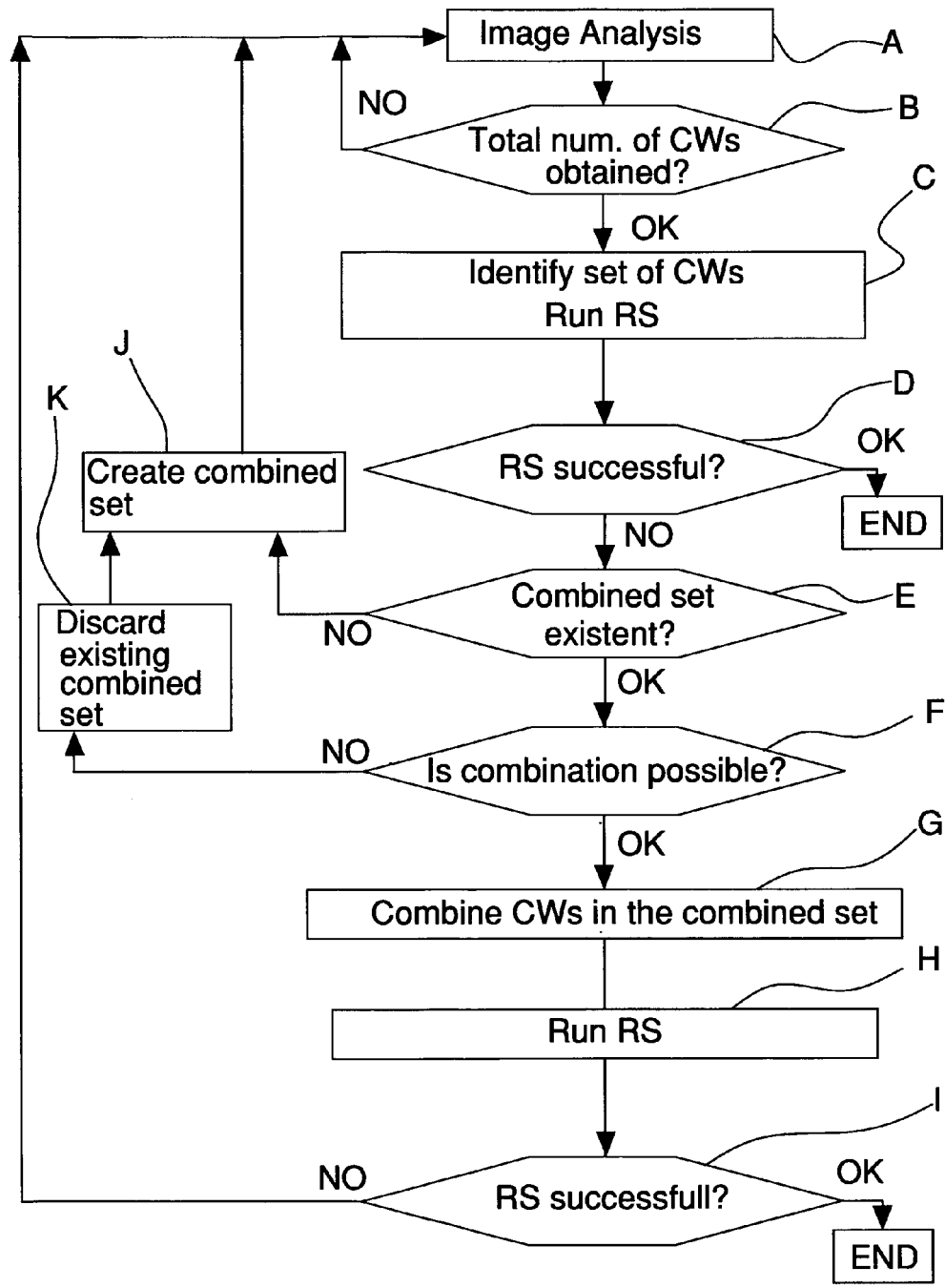
FIG. 3 shows a flow chart of the decoding method that is the object of the present invention.

In FIG. 3, with A there is indicated analysing an acquired image to obtain the total number of codewords of the two-dimensional code.

In FIG. 3, with B there is indicated evaluating whether this total number of codewords has been obtained from the acquired image.

It is to be understood that if in an image showing a two-dimensional code it is not even possible to obtain the total number of codewords, the image must be discarded inasmuch as it is not analysable and step A must be repeated, i.e. a new image must be analysed.

If it is possible to obtain a total number of codewords from the image, the image is further analysed to obtain a corresponding set of values of identified codewords, of a dimension that is equal to the total number of codewords, which are assignable to the image. Each codeword can in particular take on a numeric value, if the codeword is recognised, or vice versa an undefined value if the codeword is not recognised.

This set of codeword values is subsequently checked by applying an algorithm for error detection and self-correction, which is in this case the Reed Solomon algorithm, but could also be the "turbo code" or the "convolutional code", to have confirmation of the successful decoding of the two-dimensional code.

In FIG. 3, with C there is indicated analysing the image to obtain a corresponding set of values of identified codewords and checking this set by applying the RS algorithm.

With D there is indicated evaluating whether this check was successful.

If the check by Reed Solomon has been successful, decoding of the two-dimensional code has been possible owing to the analysis and checking of a single image and the combination with codewords of different images is not necessary. It must be emphasised that in existing decoding methods it is already known to apply steps A to D of the above method at each new image acquisition. These steps of the method have nevertheless been illustrated here for the sake of completeness.

Figure 2:
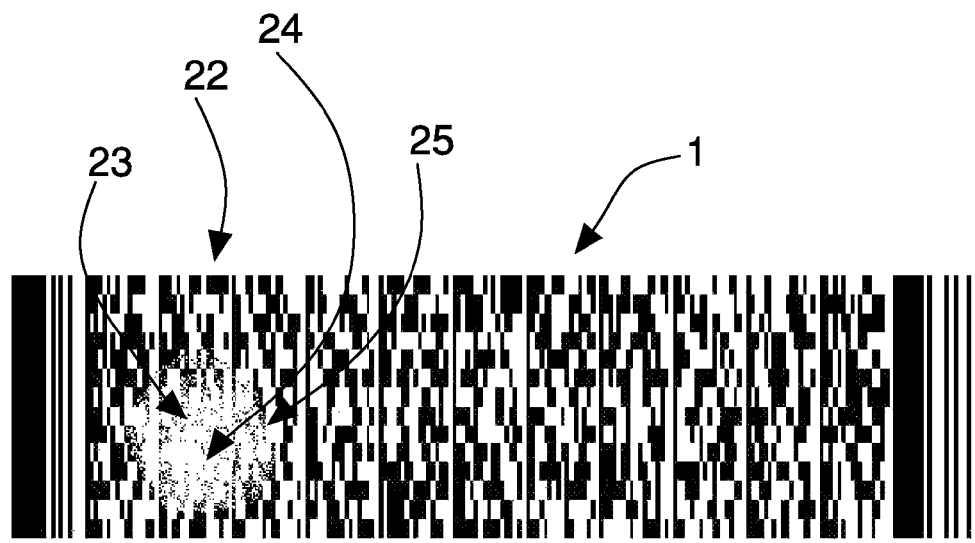
FIG. 2 shows a further image of the two-dimensional barcode in FIG. 1, as acquired in a further lighting condition.

If checking by the Reed Solomon algorithm has not been successful, the set of codewords obtained from the image has to be used, combined with codewords of other images, such as, for example, the further image in FIG. 2. Nevertheless, the presence of a different set of codewords is evaluated, for example a combined set of codewords that has already been created and stored previously, to evaluate whether we are at the start of the combination between images or in a subsequent step of the method.

With E there is indicated evaluating if a combined set of already created codewords is already present, with which the obtained set of codewords obtained from the image can be combined.

If the evaluation has a negative outcome, i.e. we are at the start of the combination between images, a combined set of codewords is created of a dimension that is equal to the total number of codewords.

With J there is indicated storing the set of codewords obtained from the image and creating the combined set of codewords.

The further acquired image, for example the image in FIG. 2 that refers to the same two-dimensional code 1, also has a portion of deteriorated image 22 of the code comprising a white spot 23, the central zone 24 of which is almost uniformly white and the edges 25 of which are blurred. It is emphasised that the white spot 23 of the further image is positioned in a zone different from the white spot 3 of the image and further has a different geometrical shape, inasmuch as it was acquired in different lighting conditions.

The further image, as said previously, is also analysed by the steps of the method A, B, C and D, obtaining a further set of codewords associated with the further image. If the check by the Reed Solomon algorithm of the sole further set of codewords is successful, the two-dimensional code is decoded with only the further image, with no need to carry out the combination with codewords of different images. The combined set and the set of codewords are thus discarded, the combination not being necessary as the decoding method has terminated.

If the check by the Reed Solomon algorithm has not been successful, it is evaluated whether a combined set of codewords is already present with which the further set of codewords can be combined.

Step E of the method is executed and the evaluation has a positive outcome, inasmuch as the combined set and the set of codewords obtained from the image with which the further set of codewords can be combined is already present.

Nevertheless, before the combination between sets of codewords in the combined set, it is evaluated if the image and the further image are combinable together inasmuch as they refer to the same two-dimensional code. This check, which will be disclosed in greater detail below, is indicated with F in FIG. 3.

With F, there is indicated evaluating whether this combination is possible.

If the combination is possible, codewords of the set and further set are combined, comparing corresponding codewords of these sets and the codewords of the combined set are assigned codewords values of the set and/or of the further set.

In FIG. 3, with G there is indicated combining the set and the further set of codewords in the combined set.

Each codeword of the combined set is in particular assigned an undefined or numeric value, which is present in a corresponding codeword of the set or of the further set, on the basis of a reliability criterion associated with each codeword of the combined set. The corresponding codeword values of the set obtained from the image and of the further set obtained from the further image are thus compared: if one codeword of the set has a numeric value different from the corresponding value of a codeword of the further set and if the corresponding codeword of the combined set is identified as unreliable, an undefined value is assigned to the corresponding codeword of the combined set.

In other words, it is preferred to introduce an undefined condition into certain codewords of the combined set rather than choosing between numeric values, but different values, of corresponding codewords to make more efficient the checking of the combined set by applying the Reed Solomon algorithm.

In order to identify a codeword of the combined set as reliable, a set of reliability indicators has been created, the dimension of which is the same as the total number of codewords, which is associated with the combined set. Each indicator is in other words associated with a corresponding codeword of the combined set and on the basis of the value of the indicator, each codeword of the combined set is evaluated as reliable or not.

A codeword of the combined set is evaluated as reliable if the corresponding indicator has a greater value than a predetermined reliability threshold value, with the threshold value greater than 1. On the other hand, the codeword is valued as unreliable if the corresponding indicator has a value that is less than or the same as the predetermined reliability threshold value.

It should be noted that the set of reliability indicators is created at the moment of the creation of the combined set and, at the moment of the creation, the value 1 is assigned to each indicator.

Furthermore, if to a codeword of the combined set an undefined value is assigned, the corresponding indicator is assigned the value 0.

In both cases, the corresponding codeword is identified as unreliable.

We have said that the comparison between corresponding codewords, to assign a value to the corresponding codeword of the combined set, occurs only if the codeword of the combined set is identified as unreliable.

For this reason, the reliability indicator associated with a codeword of the combined set is evaluated before assigning the indicator a value and the indicator is updated or maintained unchanged after the comparison between corresponding codewords.

If corresponding codewords of the set obtained from the image and of the further set obtained from the further image have the same numeric value, this coinciding numeric value is assigned to the corresponding codeword of the combined set and the corresponding reliability indicator is updated by being increased by a unit.

If the value of a codeword of the set obtained from the image is numeric and the value of the corresponding codeword of the further set obtained from the further image is undefined, this numeric value is assigned to the corresponding codeword of the combined set and the corresponding reliability indicator is maintained unvaried.

If the value of a codeword of the set obtained from the image is undefined and the value of the corresponding codeword of the further set obtained from the further image is numeric, this numeric value is assigned to the corresponding codeword of the combined set and the corresponding reliability indicator is updated by being assigned value 1.

If, on the other hand, as said previously, the codeword of said combined set is identified as reliable, the comparison between corresponding codewords is not carried out and the corresponding reliability indicator is not updated.

At the end of the comparison between corresponding codewords of the set obtained from the image and of the further set obtained from the further image, the check is executed by applying the Reed Solomon algorithm for error detection and self-correction.

With H, there is indicated checking the combined set by applying the Reed Solomon algorithm.

With I, there is indicated evaluating if this check of the combined set has been successful.

If the check by the Reed Solomon algorithm has not been successful, the combination between the codewords of the combined set and the codewords identified of a new further set of codewords, obtained by the steps A, B, C and D indicated above by a new further image of two-dimensional code can be repeated.

This repetition, based on the combination of further new images, can be carried out until either decoding of the combined set has terminated successfully or until a preset threshold number of repetitions is reached.

The set of reliability indicators associated with the combined set is updated on the basis of the new further codeword values and the value of each reliability indicator is maintained stored between combinations of successive images.

In order to make understanding of the decoding method more immediate, assigning a value to the codewords of the combined set by comparing stored codewords of the set obtained from the image and from the further set obtained from the further image has been illustrated. Without losing generality, it is also possible to assign an undefined value to all the codeword values of the combined set, upon the creation of the combined set and combine such codeword values of the combined set with the corresponding values of the set obtained from the image, according to what was illustrated previously in step G of the method. It should be noted that each indicator of the set of reliability indicators is assigned in this case a value 0, upon the creation of the combined set.

It is thus possible not to store the set of CWs obtained from the image and subsequently create the combined set but to proceed in such a manner that the values of the combined set and of the associated set of indicators, are updated with the values of the set of CWs immediately after the creation. In this case, the codewords of the further set will be compared with the codewords of the updated combined set and not with the codewords of the set obtained from the image.

Let us now consider below, by way of example, the combination between codeword values associated with several acquired images to illustrate the method of the present invention. For this purpose a tabular representation of each set of codewords is provided. Let it be supposed that 10 is the total number of codewords of the two-dimensional code and thus the set, the further set and possibly the new further set of codewords have the dimension 10. We also hypothesise creating a new set as a combined set to store the values of the combination of the sets of codewords considered and that a codeword of the combined set is judged to be reliable if the corresponding reliability indicator is greater than or the same as 3. Let us further hypothesise comparing the set obtained from the image and the further set obtained from the further image to assign a value to a codeword of the combined set (i.e. let us hypothesis not combining in succession the set obtained from the image with the combined set just created and the updated combined set with the further set) thus we initialise at 1 each reliability indicator.

In Table 1 and in Table 2 codeword values are shown respectively of an image and of a further image.

TABLE 1

| No | Value |
|----|-------|
| 1 | 125 |
| 2 | 209 |
| 3 | 87 |
| 4 | 33 |
| 5 | UNDEF. |
| 6 | 32 |
| 7 | 56 |
| 8 | UNDEF. |
| 9 | 35 |
| 10 | 48 |

TABLE 2

| No | Table |
|---|---|
| 1 | 125 |
| 2 | 209 |
| 3 | 45 |
| 4 | 309 |
| 5 | 45 |
| 6 | 32 |
| 7 | 56 |
| 8 | 87 |
| 9 | 35 |
| 10 | UNDEF. |

In Table 3 there is shown a tabular representation of the set obtained from the image, of the further set obtained from the further image, of the combined set and of the set of reliability indicators, the table of which is updated after the comparison between corresponding codewords.

TABLE 3

| No | Set | Further set | Combined set | Reliability indicator |
|---|---|---|---|---|
| 1 | 125 | 125 | 125 | 2 |
| 2 | 209 | 209 | 209 | 2 |
| 3 | 87 | 45 | UNDEF. | 0 |
| 4 | 33 | 309 | UNDEF. | 0 |
| 5 | UNDEF. | 45 | 45 | 1 |
| 6 | 32 | 32 | 32 | 2 |
| 7 | 56 | 56 | 56 | 2 |
| 8 | UNDEF. | 87 | 87 | 1 |
| 9 | 35 | 35 | 35 | 2 |
| 10 | 48 | UNDEF. | 48 | 1 |

If the Reed Solomon algorithm applied to the combined set fails, a new further acquired image is analysed and a new further set of identified codewords is obtained, which are shown below in Table 4.

TABLE 4

| No | Table |
|---|---|
| 1 | 125 |
| 2 | 209 |
| 3 | UNDEF. |
| 4 | 309 |
| 5 | 45 |
| 6 | 32 |
| 7 | 56 |
| 8 | 87 |
| 9 | 35 |
| 19 | 22 |

This further set of codewords is combined with the codewords of the combined set, subject to a preliminary check of the reliability indicators, in order to evaluate which codewords of the combined set are to be considered already reliable and not to be modified further.

In Table 5 there is shown a tabular representation of the combined set, of the corresponding set of reliability indicators, of the new further set of acquired codewords, of the updated combined set and of the corresponding set of updated reliability indicators after comparison between corresponding codewords.

TABLE 5

| No | Combined set | Reliability indicator | New further set | Updated combined set | Updated reliability indicator |
|---|---|---|---|---|---|
| 1 | 125 | 2 | 125 | 125 | 3 |
| 2 | 209 | 2 | 209 | 209 | 3 |
| 3 | UNDEF. | 0 | UNDEF. | UNDEF. | 0 |
| 4 | UNDEF. | 0 | 309 | 309 | 1 |
| 5 | 45 | 1 | 45 | 45 | 2 |
| 6 | 32 | 2 | 32 | 32 | 3 |
| 7 | 56 | 2 | 56 | 56 | 3 |
| 8 | 87 | 1 | 87 | 87 | 2 |
| 9 | 35 | 2 | 35 | 35 | 3 |
| 10 | 48 | 1 | 22 | UNDEF. | 0 |

It should be noted that at the end of the second combination the codewords having index 1, 2, 6, 7 and 9, shown in bold italics, are marked as reliable because the corresponding reliability indicators have reached the predetermined reliability threshold value. Any subsequent combination with other sets of codewords would not therefore modify the values of these codewords and the comparison would not even be made.

In Table 6 a tabular representation is provided of the codeword values of the set obtained from the image and of the combined set, after the second combination.

TABLE 6

| No | Set | Combined set |
|---|---|---|
| 1 | 125 | 125 |
| 2 | 209 | 209 |
| 3 | 87 | UNDEF. |
| 4 | 33 | 309 |
| 5 | UNDEF. | 45 |
| 6 | 32 | 32 |
| 7 | 56 | 56 |
| 8 | UNDEF. | 87 |
| 9 | 35 | 35 |
| 10 | 48 | UNDEF. |

It can thus be seen that although the two sets also comprise codewords of undefined value, the method of the present invention can change the number and the position thereof. At the same time, the method has increased the number of reliable codewords, reducing at the same time the number of erroneous codewords in the combined set, thus enabling the Reed Solomon algorithm to execute the check of the combined set successfully.

For example, the codewords 5 and 8 of undefined value in the set of Table 1 have been assigned a numeric value owing to the combination with codewords of further acquisitions. On the other hand, codewords 3 and 10 of Table 1, having a numeric value, have been assigned an indefinite value in the combined set because the decoding method did not consider these values to be reliable.

As already said previously, the total number of codewords is a very important datum in the decoding method of the present invention and it has been hypothesised until now that the image and the further image refer to the same two-dimensional code.

This, however, is not assured, especially in the case of manual readers, if the user has to acquire several two-dimensional codes, each containing information data of different type. For example, the user could interrupt the acquisition of a first code for a second one and in this case, if decoding owing to just the image of the first code has not been successful, the combination of codewords that are part of the first and of the second two-dimensional code has to be prevented.

In FIG. 3, with F there is indicated evaluating if this combination is possible and this evaluation comprises processing the image and the further image to check if the image and the further image refer to the same two-dimensional code.

Processing the image and the further image above all comprises identifying a total number of codewords, respectively for the image and the further image. If the total number of codewords for the image is different from the total number of codewords for the further image, the previously acquired image has to be discarded as the two images refer to different two-dimensional codes. The total number of codewords of the further image is assigned to the two-dimensional code.

The codewords of the further set have to be stored instead of the codewords of the set obtained from the image and the combined set that may have already been created and updated has to be discarded.

With K, there is indicated discarding the already created combined set and the stored set of codewords.

After discarding the values of codewords referring to the previously analysed two-dimensional code, step J is again performed, again creating the combined set of codewords and storing the codewords of the further set, for a possible subsequent combination with further codewords.

If, on the other hand, the check of the total number of codewords is completed successfully, corresponding values of codewords of the set and of the further set are compared to count the number of corresponding different codewords in the set obtained from the image and in the further set.

If the number of corresponding different codewords is greater than a first threshold value, the image has to be discarded inasmuch as the two images refer to two-dimensional codes of the same dimension but with a different information content.

Similarly to what has been said above, step K of the method and, subsequently, step J is performed.

If the number of corresponding codewords is the same and less than a second threshold value, also in this case, the image has to be discarded.

Similarly to what has been said above, step K of the method and subsequently step J are performed.

It should be noted that the first threshold value can take on a value that is less than or the same as the total number of codewords present in the code whilst the second threshold value can take on a value that is greater than or the same as 0.

In other words, an attempt can be made to decode the two-dimensional code even when the corresponding codewords of the set and of the further set are all different.

In use, the steps of the decoding method are performed in succession, as listed below.

Step A: an acquired image is analysed in order to obtain the total number of codewords of the two-dimensional code.

Step B: it is evaluated whether a total number of codewords has been obtained from the acquired image.

Step C: if it has been obtained, the image is analysed to obtain a corresponding set of values of identified codewords, and an algorithm for error detection and self-correction, for example the RS algorithm, is applied to this set.

Step D: it is evaluated whether this RS algorithm check has been successful.

If the check has not been successful, it is necessary to continue by analysing a further image and repeating the steps of the method from A to D.

Step E: it is evaluated if a set of stored codewords is present with which the further set of codewords can be combined.

Step J: if a set of stored codewords does not exist, the codewords of the set obtained from the image are stored and the combined set of codewords is also created.

Step F: if a set of stored codewords exists, it is evaluated whether the combination between the two sets is possible.

Step G: if the combination is possible, the set and the further set of codewords are combined that are obtained respectively from an image and from a further image, by assigning the codeword values of the combined set from the comparison between the corresponding codewords and promoting the choice of undefined values.

Step K: if the combination is not possible, the set of codewords obtained from the image and the combined set are discarded, the further set of codewords is stored and the combined set is created again.

Step H: an algorithm for error detection and self-correction, for example the RS algorithm, is applied to the combined set.

Step I: it is evaluated if the RS algorithm check has been successful.

If the RS algorithm check has been successful, the decoding method is terminated, otherwise it is necessary to continue by analysing a further image and repeat the steps of the method from A to I.

Owing to the decoding method of the present invention, the combined set thus has a greater probability of being decoded because it has a smaller number of erroneous codewords. In fact, the probability of having an erroneous codeword in the combined set is low inasmuch as a numeric value of a codeword is confirmed only if it has been seen to be always equal to itself between the different sets of codewords to be combined.

Further, preliminary checks are conducted on the codewords of the sets to be combined that enable a combination between different two-dimensional codes to be avoided, i.e. with a different total number of codewords, or containing different information data, i.e. with corresponding codewords that are very different from one another.

The RS algorithm is thus applied to a combined set comprising not only combined codewords for which the number of erroneous codewords has been minimised but also deriving from images of the same two-dimensional code.

This enables the probability of success of the RS algorithm to be maximised and thus decoding of a two-dimensional code to be accelerated.

According to a preferred embodiment, before analysing the codeword values of the image and/or further image, portions of the code are detected that are associable with zones of a deteriorated image, like the portions 2 and 22 in FIGS. 1 and 2. The codewords that are part of these portions, in particular the codewords of the central zone 4 and 24, are preliminarily assigned an undefined value to avoid codewords identified with numeric values in zones in which such numeric values are erroneous. Nevertheless, the codewords of the edge zones 5 and 25 can be assigned both an undefined value and retain the numeric values identified with the analysis of the image, although such values may be erroneous values.

Owing to this version, the speed of execution of the decoding method is further promoted by avoiding codewords with erroneous values where an analysis of the overall image is possible.

What is claimed is:

1. A method for decoding a two-dimensional optical code formed by a preset number of codewords, wherein decoding of said code based on a single acquired image has not been successful, comprising analysing an acquired image and at least one further acquired image of said code to obtain a respective set and further set of values of identified codewords, assigned to said code by said acquired image and by said further acquired image, each codeword being able to take on either an undefined value or a numeric value if said codeword is recognised; creating a combined set of codewords and combining said set and said further set by assigning each codeword of said combined set a value of said set and/or of said further set, wherein said combining comprises, for each codeword of said combined set, comparing corresponding codewords of said set and of said further set and if said corresponding codewords respectively have a numeric value and a further different numeric value and said codeword of said combined set is identified as unreliable, assigning an undefined value to said codeword of said combined set and checking said combined set by applying an algorithm for error detection and self-correction to have confirmation of the successful decoding of said two-dimensional code, said assigning said undefined value making more efficient said checking by said algorithm for error detection and self-correction.

2. The decoding method according to claim 1, further comprising creating a set of reliability indicators, wherein each indicator is associated with a corresponding codeword of said combined set, said comparing further comprising, for each codeword of said combined set, evaluating whether said codeword is identified as reliable or unreliable on the basis of the corresponding indicator associated with said codeword.

3. The decoding method according to claim 2, further comprising, after assigning said value to said codeword of said combined set, updating said corresponding indicator associated with said codeword.

4. The decoding method according to claim 2, further comprising, upon the creation of said combined set, assigning an undefined value to each codeword of said combined set and a value 1 to each indicator.

5. The decoding method according to claim 2, further comprising, upon the creation of said combined set, assigning an undefined value to each codeword of said combined set and value 0 to each indicator and wherein said comparing comprises comparing corresponding codewords of said combined set and of said set obtained by said acquired image, updating said combined set and said set of reliability indicators and comparing said updated combined set with said further set.

6. The decoding method according to claim 2, further comprising identifying a codeword of said combined set as reliable if the corresponding indicator has a value that is greater than a reliability threshold value, in particular said reliability threshold value being greater than 1, and considering said codeword as unreliable if it has a value that is less than or the same as said reliability threshold value.

7. The decoding method according to claim 2, further comprising, if said codeword of said combined set is assigned said undefined value, assigning value 0 to said corresponding indicator.

8. The decoding method according to claim 2, wherein said comparing corresponding codewords and said assigning a value to said codeword of said combined set occurs only if said codeword of said combined set is identified as unreliable.

9. The decoding method according to claim 8, further comprising, if said corresponding codewords of said set and further set have the same numeric value, assigning said coinciding numeric value to the corresponding codeword of said combined set and increasing said corresponding indicator.

10. The decoding method according to claim 8, further comprising, if the value of said codeword of said set is numeric and the value of said corresponding codeword of said further set is undefined, assigning said value to said corresponding codeword of said combined set and maintaining said corresponding indicator unvaried.

11. The decoding method according to claim 8, further comprising, if the value of said codeword of said set is undefined and the value of said corresponding codeword of said further set is numeric, assigning said numeric value to said codeword of said combined set and assigning to 1 the value of said corresponding indicator.

12. The decoding method according to claim 2, wherein if said codeword of said combined set is identified as reliable, said comparing does not occur and the value of said codeword and of said corresponding reliability indicator are not modified.

13. The decoding method according to claim 1, further comprising, before said combining, checking said at least one further acquired image by applying said algorithm for error detection and self-correction to try to decode successfully said two-dimensional code by said at least one further acquired image.

14. The decoding method according to claim 13, further comprising updating said set of reliability indicators after comparing and updating said combined set.

15. The decoding method according to claim 1, further comprising, if said algorithm for error detection and self-correction has not successfully checked said combined set, analysing a subsequent further acquired image of said code and updating said combined set on the basis of said reliability indicators by means of said codeword values assigned to said successive further acquired image, checking said updated combined set by applying said algorithm for error detection and self-correction to terminate said decoding in the event of success or acquire another further acquired image to be combined with said codeword values of said updated combined set if said algorithm for error detection and self-correction has not successfully checked said updated combined set.

16. The decoding method according to claim 1, wherein said analysing an acquired image and/or a further acquired image of said code comprises detecting portions of said code that are associable with zones of a deteriorated image and assigning an undefined value to codewords that are part of said portions.

17. The decoding method according to claim 1, wherein said analysing comprises processing said acquired image and said further acquired image of said two-dimensional code to check if said acquired image and further acquired image refer to the same two-dimensional code.

18. The decoding method according to claim 17, wherein said processing comprises identifying in said acquired image and further acquired image a respective total number of codewords and further total number of codewords from which said two-dimensional code is formed and if said total number of codewords is different from said further total number of codewords, discarding said acquired image and trying to decode said code by considering exclusively said further acquired image.

19. The decoding method according to claim 17, further comprising if said total number of codewords is the same as said further total number of codewords, assigning this coinciding total number of codewords to the total number of codewords from which the code is formed.

20. The decoding method according to claim 18, wherein, in relation to the two-dimensional symbology used, said total number of codewords from which the code is formed is obtainable directly from the two-dimensional code or inferred therefrom inasmuch as it is expressed as a number of rows or columns.

21. The decoding method according to claim 1, further comprising, before said combining said set and said further set of codeword values, checking if said set and further set of codeword values refer to the same two-dimensional code.

22. The decoding method according to claim 21, further comprising counting the number of corresponding different codewords in said set and further set and if said number of corresponding different codewords is greater than a first threshold value, discarding said acquired image and trying to decode said code by considering exclusively said further acquired image.

23. The decoding method according to claim 22, wherein said first threshold value can be less than or equal to the total number of codewords present in the code.

24. The decoding method according to claim 21, further comprising counting the number of corresponding codewords that are the same in said set and further set and if said number of corresponding codewords that are the same is less than a second threshold value, discarding said acquired image and trying to decode said code by considering exclusively said further acquired image.

25. The decoding method according to claim 24, wherein the value of said second threshold can be greater than or the same as 0.

* * * * *